United States Patent [19]
Suzuki

[11] 3,799,538
[45] Mar. 26, 1974

[54] COPY SHEET CASSETTE MOUNTING DEVICE FOR COPYING APPARATUS

[75] Inventor: Shigeru Suzuki, Yokohama, Japan

[73] Assignee: Ricoh Co., Ltd., Tokyo, Japan

[22] Filed: Feb. 23, 1973

[21] Appl. No.: 335,017

[30] Foreign Application Priority Data
Mar. 10, 1972 Japan............................ 47-25027

[52] U.S. Cl.................... 271/162, 271/117, 271/170
[51] Int. Cl............................. B65h 1/26, B65h 3/06
[58] Field of Search................... 271/117, 162–164, 271/118, 170; 211/50

[56] References Cited
UNITED STATES PATENTS
3,565,420  2/1971  Howard ........................... 271/163 X
3,588,106  6/1971  Csaba et al. ........................ 271/170

Primary Examiner—Evon C. Blunk
Assistant Examiner—James W. Miller
Attorney, Agent, or Firm—Cooper, Dunham, Clark, Griffin & Moran

[57] ABSTRACT

A device for mounting a copy sheet cassette on a copy sheet feed tray pivotally supported at its lower end by the copying apparatus for movement between a copy sheet feed position and a cassette mounting position. The device is effective to move, when the copy sheet feed tray is in the cassette mounting position, the copy sheet feed roller and corner separator means in positions in which they do not interfere with the mounting of the cassette on the copy sheet feed tray.

4 Claims, 6 Drawing Figures

COPY SHEET CASSETTE MOUNTING DEVICE FOR COPYING APPARATUS

BACKGROUND OF THE INVENTION

This invention is related to a copy sheet cassette mounting device for copying apparatus.

Copy sheets may be supplied to the exposing station of a copy sheet by one of the following two processes; a roll of a web of paper or other material mounted in the copying apparatus may be unwound and cut into sheets of a suitable size, or copy sheets cut into a suitable size and placed on the copy sheet feed tray beforehand may be supplied one by one to the exposing station by means of an automatic copy sheet feed device.

The use of copy sheets cut into a suitable size beforehand is adapted for high speed copying operation and especially for producing a large number of duplicates from one original. Though this method does not permit to supply copy sheets of a size suitable for a particular original to be copied without requiring manual attention, the method eliminates the need to unwind and cut the roll and enables copy sheet feed to be carried out quickly.

The method, however, has a disadvantage in that manual attention is required for arranging copy sheets when the copy sheets on the feed tray are exhausted and should be replenished or the copy sheets on the tray should be replaced by copy sheets of a different size. Copy sheets cut to a predetermined size beforehand should be placed on the tray and correctly positioned thereon by being arranged properly at the front end and opposite sides by means of regulating plates so that a neat stack of copy sheets may be formed. This manual attention can be eliminated by using copy sheets stored in a cassette which is capable of being mounted on and removed from the copy sheet feed tray readily. If copy sheet cassettes differing in size and type from one another depending on the sizes and types of copy sheets stored therein and adapted to be readily mounted on and removed from the copy sheet feed tray in copying apparatus are ready on hand, it is possible to eliminate the trouble which has hitherto been associated with the operation of replenishing the copy sheets on the copy sheet feed tray or replacing them with copy sheets of a different size.

When the aforementioned copy sheet feed cassettes are used, it is desirable that the cassette mounted in the copying apparatus be automatically positioned correctly on the copy sheet feed tray irrespective of its size. Besides, the use of such cassettes makes it necessary to move the copy sheet feed roller and corner separator means between two positions; an operative position and a non-operative position. In the operative position, the feed roller and corner separator would be in engagement with the copy sheets on the copy sheet feed tray, in the non-operative position, they would be moved away from the copy sheet feed tray so that they may not interfere with the mounting of the cassette.

SUMMARY OF THE INVENTION

This invention has as its object the provision of a copy sheet cassette mounting device for copying apparatus which obviates the aforementioned problem of the prior art.

The device according to the invention is characterized by the feature that the copy sheet feed roller of a copying apparatus is brought into engagement with copy sheets in the copy sheet cassette at a predetermined position irrespective of the size of the cassette when the latter is placed on the copy sheet feed tray, with the upper end of the cassette serving as a reference, the tray being movable between a copy sheet feed position and a cassette mounting position. Thus, the need to regulate the position of the cassette on the copy sheet feed tray, to adjust the position of the cassette on the tray because of the difference in size of the cassette, and to arrange the copy sheets at the front and opposite sides thereof is eliminated.

The device according to the invention is further characterized by the feature that the copy sheet feed tray is moved between a copy sheet feed position and a cassette mounting position conjointly with the closing and opening of a cover for the copy sheet feed tray. The copy sheet feed roller and corner separator means are moved away from the copy sheet feed tray to an inoperative position when the tray is in its cassette mounting position to facilitate the placing of the cassette on the tray, and brought automatically into engagement with the copy sheets on the copy sheet feed tray when the tray is in its operative position, with the tray being locked and prevented from being moved from the copy sheet feed position.

According to the invention, a copy sheet cassette of any size as desired can be readily mounted on and removed from the copy sheet feed tray of a copying apparatus, and the need to adjust the position of the cassette on the tray with respect to the width and the length of the latter according to the size of a cassette is eliminated. The copy sheet feed tray can be moved between the copy sheet feed position and the cassette mounting position conjointly with the closing and opening of the cover for the copy sheet feed tray. When the copy sheet feed tray is disposed in the cassette mounting position, the copy sheet feed roller and corner separator means are moved away from the tray to facilitate the mounting of a cassette. When the tray is disposed in the copy sheet feed position, the tray can be locked in the copy sheet feed position and the cover can be kept closed without using a lock by maintaining a shaft common to the link mechanism and the cover in a position which is disposed near the dead point and in a direction opposite to the direction in which it is moved when the cover is opened.

DESCRIPTION OF A PREFERRED EMBODIMENT OF THE INVENTION

Figure 1:
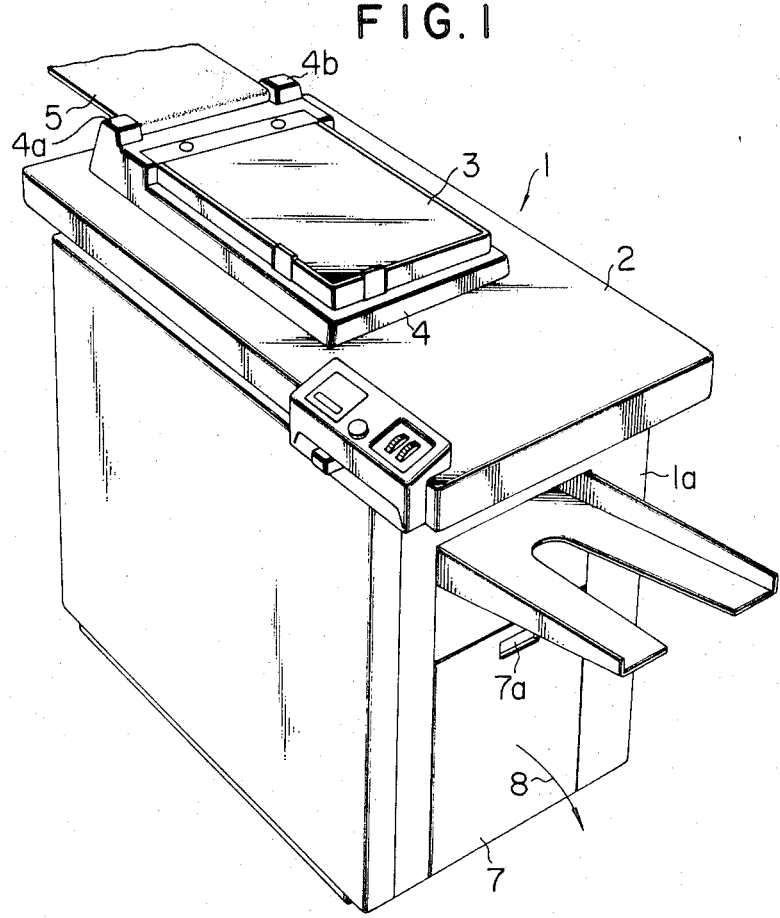
FIG. 1 is an external view of a copying apparatus in which the invention is incorporated.

In FIG. 1, the copying apparatus 1 includes an upper surface 2 on which is provided a transparent original rest plate 3 on which an original to be copied is placed. Original rest plate 3 is supported by a frame 4 secured to upper surface 2 and formed at opposite sides at one end thereof upstanding projections 4a and 4b which pivotally support a base of a pressing plate 5 adapted to be moved to an original hold-down position after an original is placed on rest plate 3 to intercept light directed from the inside of the apparatus toward the original.

Copying apparatus 1 has a cover 7 provided at one side and adjacent one side wall 1a of the apparatus and adapted to be opened and closed for inserting a copy sheet cassette 6 (see FIG. 2) into the apparatus and withdrawing it therefrom. Cover 7 is hinged at its lower end to the apparatus so that it can be opened by moving a handle 7a in the direction of an arrow 8 and can be closed again.

Figure 2:
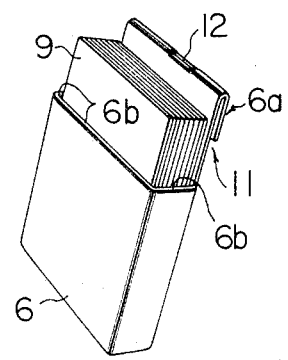
FIG. 2 is a perspective view of a copy sheet cassette used in the invention.

In FIG. 2, copy sheet cassette 6 is shown as containing therein a number of copy sheets 9 cut to a predetermined size. Normally, the cassette is sealed so that the copy sheets therein are now seen from outside, but three side walls 6b of cassette 6 are fragile and can be readily broken by leaving one end plate 6a. By breaking the three side walls and removing them, an end portion of a predetermined size of copy sheets can be exposed to view. The exposed end portion of copy sheets 9, which is constant irrespective of the size of the cassette, is sufficiently large to permit a feed roller to be brought into engagement therewith as subsequently to be described. The end plate 6a is bent outwardly as shown in FIG. 2 to provide a hook 11 adapted to hold the cassette in place in the apparatus. A perforation 12 is provided in the central portion of the bend of end plate 6a to provide a reference opening for positioning the cassette in the copying apparatus when the perforation is ripped open by a projection provided in a copy sheet feed tray when the cassette is placed on the tray as subsequently to be described.

Figure 3:
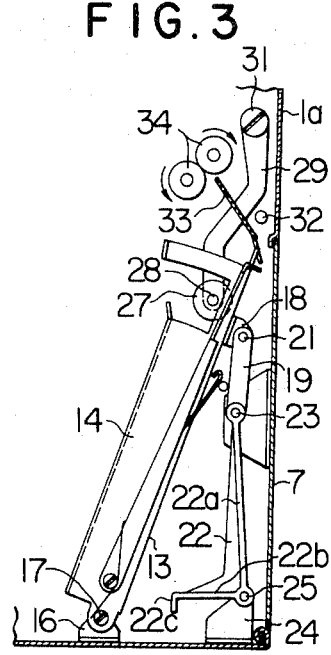
FIG. 3 is a front view of a copy sheet cassette mounting device comprising one embodiment of the invention.
Figure 5:
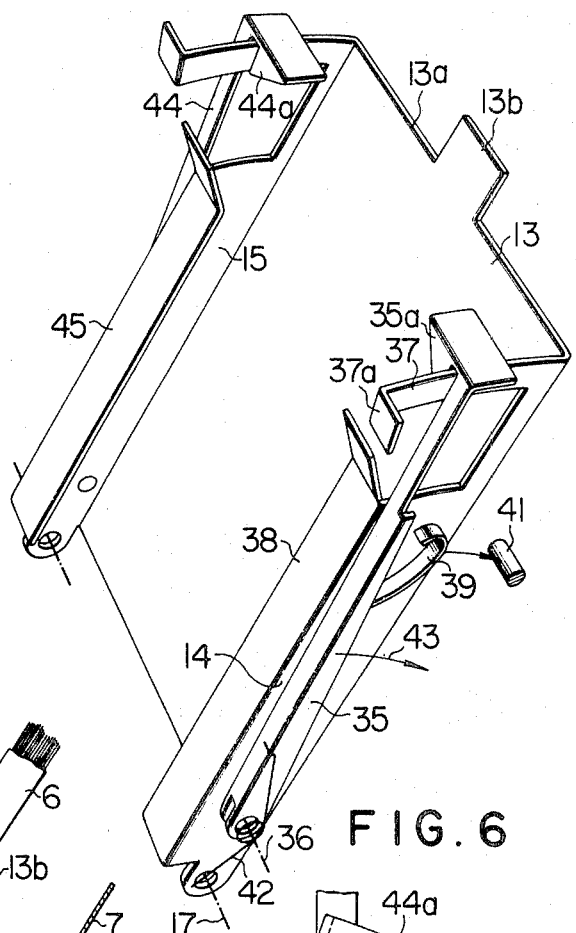
FIG. 5 is a perspective view of a copy sheet feed tray.

In FIG. 3, a copy sheet feed tray 13 is disposed in an inclined position at one corner of the copying apparatus 1 and includes two side walls 14 and 15 (See FIG. 5 for the numeral 15). Copy sheet feed tray 13 is pivotally connected at its lower end to a bottom plate 1b of copying apparatus 1 by a shaft 17 extending through the lower ends of side plates 14 and 15. A link arm 19 is pivotally connected at one end thereof to a hinge 18 secured to the upper portion of the underside of tray 13 through a shaft 21, and the other end of link arm 19 is pivotally connected to the end of a major arm 22a of a two-arm link 22 which is pivotally connected at a base thereof through a shaft 25 to a hinge 24 secured to bottom plate 1b. A minor arm 22b of two-arm link 22 is formed at its free end with a bent portion 22c adapted to support the underside of tray 13 when the tray is in its copy sheet feed position.

The shaft 21 connecting major arm 22a to link arm 19 loosely extends through a slot 26a (See FIG. 4) formed in a support plate 26 which is secured at a base thereof to the underside of cover 7. Thus, when cover 7 is opened, copy sheet feed tray 13 is moved automatically to the position shown in FIG. 4, when cover 7 is closed, tray 13 is automatically moved to the position shown in FIG. 3. While cover 7 remains closed, cover 7 is maintained in a position in which it is flush with side plate 1a and copy sheet feed tray 13 is maintained in its copy sheet feed position shown in FIG. 3. When cover 7 remains open, the free end 22c of minor arm of two-arm link 22 is maintained in engagement with the underside of tray 13, so that tray 13 is held in its cassette mounting position.

When copy sheet feed tray 13 is in its copy sheet feed position as shown in FIG. 3, the shaft 23 connecting link arm 19 to the major arm 22a of two-arm link 22 is disposed slightly inwardly (leftwardly in FIG. 3) of the line connecting shaft 21 to shaft 25, so that it is disposed inwardly of the dead point. Since the center of gravity of tray 13 is disposed rightwardly of shaft 17, tray 13 tends to move clockwise about shaft 17 and causes shaft 21 to rotate clockwise and shaft 25 to rotate counter clockwise. Shaft 23 is unable to move in either direction because its movement is regulated by the major portion 22a of two-arm link 22 and the slot 26a formed in support plate 26. This precludes shaft 21 from rotating clockwise. Thus, copy sheet feed tray 13 is locked in its copy sheet feed position shown in FIG. 3. Tray 13 is unlocked when cover 7 is opened and shaft 23 is moved outwardly of the dead point, i.e., rightwardly in FIG. 3, of the line connecting shaft 21 to shaft 23 in FIG. 3.

Figure 4:
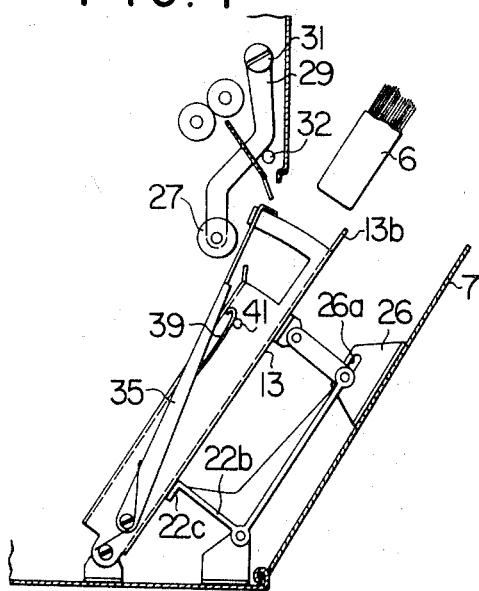
FIG. 4 is a view in explanation of the operation of the device shown in FIG. 3.
Figure 6:
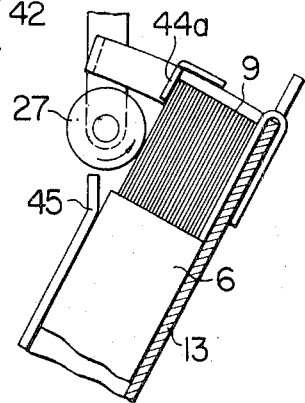
FIG. 6 is a sectional side view showing a copy sheet feed roller and separating claws in their respective positions when the copy sheet feed tray is in its copy sheet feed position.

It will be appreciated that copy sheet feed tray 13 can be moved between the copy sheet feed position shown in FIG. 3 and the cassette mounting position shown in FIG. 4 conjointly with the closing and opening of cover 7, and that tray 13 is supported by the minor arm 22b of two-arm link 22 when it is in the cassette mounting position and locked in the copy sheet feed position by the shaft 23 disposed inwardly of the dead point. Tray 13 is automatically unlocked when cover 7 is opened. When tray 13 is locked in the copy sheet feed position, the free end of cover 7 is maintained in pressing engagement with side plate 1a by the force of shaft 23 with which shaft 23 tends to move inwardly (leftwardly in FIG. 3). Thus, the need to use a lock to lock cover 7 in its closed position can be eliminated.

In FIG. 3, a copy sheet feed roller 27 supported by a shaft 28 connected to the free end of supporter 29 is maintained in pressing engagement with the upper portion of the surface of copy sheet feed tray 13. Supporter 29 is pivotally connected at a base thereof to a suitable immovable part (not shown) of the copying apparatus through a shaft 31. When copy sheet feed tray 13 is moved to the position shown in FIG. 4, supporter 29 is brought into engagement, at one side edge thereof, with a stopper 32 connected to the immovable member, so that roller 27 is maintained in the position shown in FIG. 4. Thus, when copy sheet feed roller 27 is maintained in engagement with tray 13 as shown in FIG. 3, there is at least a small clearance between support 29 and stopper 32.

A guide plate 33 and a pair of delivery rollers 34 for guiding the copy sheet fed from tray 13 by roller 27 are disposed above tray 13. Delivery rollers 34 rotate in the opposite directions as shown by arrows in synchronism with the feeding of copy sheets to deliver the latter to a necessary station or an exposing station.

In FIG. 5, a corner separator 35 is pivotally connected at a base thereof to the side plate 14 of tray 13 through a shaft 36 and formed at its free end with a separator claw 35a. Separator claw 35a and the body of corner separator 35 defines therebetween a recess for loosely receiving therein an upstanding guide bar 37 formed at a free end thereof with a stopper 37a for limiting the range of movement of separator claw 35a. A hold-down bar 38 slightly bent at one end thereof is provided on one side of side plate 14 for holding down cassette 6 when it is mounted on tray 13.

A resilient element 39 is secured at a base thereof to corner separator 35, and a stopper 41 secured to an immovable part (not shown) is disposed in face-to-face relationship with element 39, with a clearance therebetween. Corner separator 35 is urged by the biasing force of a spring 42 connected at one end to shaft 17 and at the other end to separator 35 to move in the direction of an arrow 43. Thus, when no cassette is mounted on tray 13, separator claw 35a is maintained in pressing engagement with copy sheet feed tray 13 by the biasing force of spring 42 as shown in FIG. 3.

The other side plate 15 of copy sheet feed tray 13 is also provided with a corner separator 44, separator claw 44a and hold-down bar 45 which are of the same construction and operate in the same manner as the corresponding parts described above with reference to side plate 14. Their description will be omitted to save space.

The manner of mounting a cassette on the copy sheet feed tray will now be described. When cassette 6 (See FIG. 2) storing therein a number of copy sheets 9 is mounted in the copying apparatus 1, cover 7 is opened to bring tray 13 to its cassette mounting position. While in this position, tray 13 is supported by the bent portion 22c of minor arm 22b of two-arm link 22. When cover 7 is opened and tray 13 is brought to its cassette mounting position, the supporter 29 for copy sheet feed roller 27 is brought into abutment with stopper 32 and the resilient element 39 of corner separator 35 is brought into abutment with stopper 41, so that copy sheet feed roller 27 and corner separator 35 are each brought to a stand-by position in which they are moved away from tray 13 as shown in FIG. 4.

Cassette 6 is inserted in the copying apparatus and placed on tray 13 obliquely downwardly as shown in FIG. 4 when roller 27 and corner separator 35 is in stand-by positions. A projection 13b is formed as shown in FIG. 5 in the central portion of an upper end 13a of tray 13 and adapted to rip open perforation 12 (See FIG. 2) to form an opening therein when hook 11 is placed on upper end 13a. Thus, cassette 6 can be correctly positioned on tray 13 with respect to the width thereof.

After cassette 6 is thus placed on tray 13, cover 7 is closed. Closing of cover 7 automatically brings tray 13 to the copy sheet feed position shown in FIG. 3 in which tray 13 is maintained by the aforementioned action. When tray 13 is moved from the cassette mounting position to the copy sheet feed position, copy sheet feed roller 27 is brought into engagement with the exposed portion of the uppermost copy sheet of copy sheets 9 in the cassette and separator claws 35a and 44a and brought into engagement with the upper opposite corners of the exposed portion of the uppermost copy sheet, so that roller 27 rotates clockwise in FIG. 4 and claws 35a and 44a rotate in the opposite direction. Thus, copy sheet feed roller 27 and separator claws 35a and 44a are brought into engagement with copy sheets 9 in respective portions ready for the copy sheet feed operation. In this condition, one copy sheet after another can be fed to the delivery rollers by rotating roller 27 in the direction of the arrow.

What is claimed is:

1. A copy sheet cassette mounting device for a copying machine, comprising a copy sheet feed tray having a lower end and pivotally connected at said lower end thereof to an immovable member secured to the copying machine for removably mounting a copy sheet cassette thereon, support means secured to the copying machine for moving said copy sheet feed tray between a copy sheet feed position and a cassette mounting position, cassette positioning means provided on said copy sheet feed tray for correctly positioning the cassette with an upper end thereof as a reference in mounting the same on the copy sheet feed tray, a cover for the copy sheet feed tray operatively connected thereto, a copy sheet feed roller for supplying one copy sheet after another from the cassette mounted on the copy sheet feed tray, corner separator means provided on the copy sheet feed tray, and means for moving said copy sheet feed roller and said corner separator means to an inoperative position to facilitate mounting of the cassette on the copy sheet feed tray when said cover is opened and the copy sheet feed tray is moved to its cassette mounting position.

2. A device according to claim 1 wherein said cassette positioning means comprises a projection formed at an upper end of the copy sheet feed tray.

3. A device according to claim 1 wherein said cover is operatively connected to said copy sheet feed tray through a link mechanism for causing the copy sheet feed tray and the cover to move as a unit.

4. A copying machine comprising an enclosure having a side wall with a side facing opening therein, a cover pivotally mounted at its lower end to said enclosure and moveable pivotally between a closed position in which it is flush with said side wall and closes the opening therein and an open position in which the upper end of the cover extends outwardly and away from said side wall, a copy sheet feed tray for removably mounting a copy sheet cassette, said feed tray having a lower end pivotally secured to the enclosure to pivot about an axis parallel to that of the cover and disposed inwardly of said side wall, an upper end having an upwardly extending projection adapted to register with a corresponding aperture in a cassette mounted on the feed tray, and corner separator means, means for linking the feed tray and the cover to cause the feed tray to pivot to a mounting position in which its upper end points outwardly of said side wall and protrudes through said opening therein when the cover is manually moved to its open position, and to pivot to a copy sheet feed position in which the feed tray is inwardly of said side wall when the cover is manually moved to its closed position, said feed tray leaning toward the cover when in its feed position, and said linking means including means for gravity biasing the feed tray and the cover toward their feed and closed positions respectively when the cover is manually closed, and means for feeding sheets from a cassette mounted on said feed tray, said feeding means operative only when the feed tray is in its feed position.

* * * * *